United States Patent Office.

CHRISTOPHER T. PROVOST, OF NEW YORK, N. Y.

Letters Patent No. 104,494, dated June 21, 1870.

IMPROVEMENT IN CONCENTRATING THE JUICE OF TOMATOES.

The Schedule referred to in these Letters Patent and making part of the same.

*To all whom it may concern:*

Be it known that I, CHRISTOPHER T. PROVOST, of the city, county, and State of New York, have invented a new and improved Process of Concentrating Tomatoes; and I do hereby declare that the following is a full, clear, and exact description thereof, which will enable others skilled in the art to make and use the same.

This invention has for its object so to prepare tomatoes for preservation that only the nutritious and aromatic matter, but none of the useless bulk or body, will be retained. The fruit can thereby be preserved in the most concentrated form, and will not occupy superfluous space.

My invention consists in treating the tomatoes in the following manner:

The ripe fruit is, between two perforated plates, or in other suitable machinery, compressed, so that the juice will be entirely separated from the skins of fruit and seed.

The juice contains all the nutritious and aromatic ingredients of the fruit, while the skins of fruit and seed are indigestible.

The juice is then, in a suitable vessel, exposed to the action of heat, to evaporate the superfluous water.

An extract or tomato-syrup is thus obtained which contains all that is valued of the fruit in the most condensed form.

Having thus described my invention,

I claim as new and desire to secure by Letters Patent—

1. The herein-described process of concentrating tomatoes, as set forth.
2. The concentrated tomato-juice, prepared substantially as herein specified.

CHRISTOPHER T. PROVOST.

Witnesses:
GEO. W. MABEE,
ALEX. F. ROBERTS.